United States Patent [19]

Sendelweck

[11] Patent Number: 5,068,730
[45] Date of Patent: Nov. 26, 1991

[54] VIDEO CONTROL CIRCUIT
[75] Inventor: Gene K. Sendelweck, Indianapolis, Ind.
[73] Assignee: Thomson Consumer Electronics, Inc., Indianapolis, Ind.
[21] Appl. No.: 543,900
[22] Filed: Jun. 26, 1990

Related U.S. Application Data

[63] Continuation of Ser. No. 340,652, Apr. 20, 1989, abandoned.

[51] Int. Cl.[5] .......................... H04N 5/57; H04N 5/59
[52] U.S. Cl. ...................................... 358/169; 358/243
[58] Field of Search ............... 358/169, 243, 242, 168, 358/174, 170

[56] References Cited

U.S. PATENT DOCUMENTS

| | | | |
|---|---|---|---|
| 4,126,884 | 11/1978 | Shanley, II | 358/21 |
| 4,167,025 | 9/1979 | Willis | 358/243 |
| 4,549,218 | 10/1985 | Norley et al. | 358/243 |
| 4,599,643 | 7/1986 | Harlan | 358/74 |
| 4,689,668 | 8/1987 | Sutherland, II et al. | 358/74 |
| 4,760,450 | 7/1988 | Yagi | 358/170 |

Primary Examiner—Tommy P. Chin
Attorney, Agent, or Firm—Joseph S. Tripoli; Joseph J. Laks; Harvey D. Fried

[57] ABSTRACT

A control circuit comprises a first detector for detecting amplitude excursions of a signal related to luminance information beyond a white level threshold during each horizontal scan. This enables the circuit to be more sensitive by responding to excursions occurring during each horizontal scanning line. A first timer, responsive to the first detector, provides a first control signal related to a minimum duration of each amplitude excursion of the signal beyond the threshold. A switch and second timer, responsive to the first control signal, provide a second control signal which falls at a first rate to reduce the signal; and, which rises at a second rate to permit the signal to increase after termination of the amplitude excursion, until the next minimum duration excursion. The time constant for the second rate is much greater than the time constant of the first rate.

40 Claims, 2 Drawing Sheets

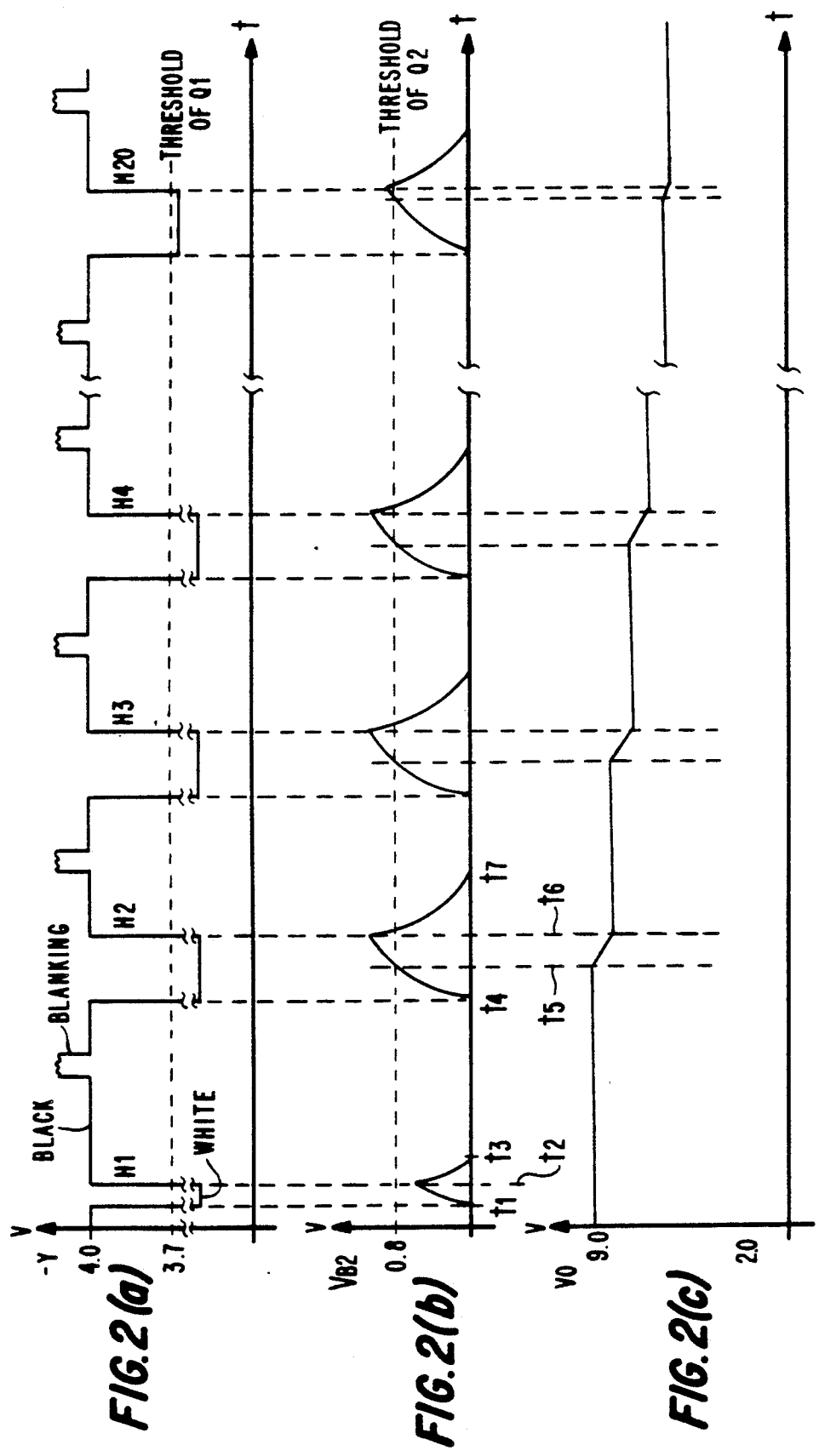

VIDEO CONTROL CIRCUIT

CROSS REFERENCE TO RELATED APPLICATIONS

This application is a continuation of copending application Ser. No. 340,652, filed Apr. 20, 1989, and now abandoned.

BACKGROUND OF THE INVENTION

1. Field of the Invention

This invention relates to the field of control circuits for video signals in television receivers and video monitors.

2. Description of Related Art

Excursions of signals related to the luminance of a video signal beyond a white level threshold can cause problems in a television receiver or in a video monitor. Excessive beam currents in the cathode ray tube of a television receiver, for example, can result in a degraded image. Such excess beam currents can adversely affect the performance of the receiver deflection system for the cathode ray tube, can cause electron beam spot defocusing and can cause picture blooming. High beam currents which exceed the safe operating capacity of the cathode ray tube can result in damage to the cathode ray tube itself, as well as to other circuits or components in the receiver.

Many circuits are known for controlling average beam currents, by monitoring a signal representative of the magnitude of the cathode ray tube beam current derived from the cathode ray tube high voltage resupply system of the receiver. In one such arrangement, as described in U.S. Pat. No. 4,167,025—Willis, a beam current limiter responds to the current resupply derived signal when the signal exceeds a threshold level.

A cathode ray tube for a color receiver has a tendency to shift color purity in any area where there is localized heating of the shadow mask, for example where there is a relatively large white area. This condition is often referred to as blistering. The condition is usually worse on larger tubes, for example those having larger screen sizes, such as 27 inch or 31 inch diagonal measurements. Monitoring average beam current is generally inadequate to detect and prevent localized peaks of beam current, which are those responsible for localized shadow mask heating. The accepted method for preventing blistering is to reduce the level of video drive so that beam current in the white area is not high enough to cause discoloration. However, larger television screens are often also darker. Limiting the beam current in this fashion may make the displayed picture unnecessarily dim, especially for small white areas.

In order to cope with the problems of peak beam currents, not reflected in values of average beam current, other beam limiter circuits have been developed. In U.S. Pat. No. 4,599,643-Harlan, excessive beam currents are limited by means which operate independently of the cathode ray tube current resupply system. Instead, a combined signal representative of the combined instantaneous magnitudes of plural color signals is utilized. Beam current is limited, for example by reducing contrast, if the combined signal exceeds a threshold. Another beam limiter operating responsive to a combined color video signal is disclosed in U.S. Pat. No. 4,689,668—Sutherland, II, et al. The control circuit includes, in the following order, a first low pass filter, a first peak detector, a second low pass filter, and a second peak detector. The second peak detector develops a control signal for limiting the amplitude of the video signal. The second low pass filter has a time constant of about 5 V, where V is the period of a vertical field. This is substantially greater than the time constant of the first peak detector, which is about 0.05 H, where H is the period of one horizontal scanning line. In practice, the circuit will respond to beam currents conducted by white areas as small as approximately a full screen height vertical bar pattern having a width of about 10% of the screen. Wider patterns of lower height will also result in control of beam current by the circuit. In either case, persistence of the condition must continue for successive vertical fields in order for the respective thresholds to be surpassed and beam current limited.

Although the foregoing circuits have proved effective for preventing blistering in the shadow masks of the cathode ray tubes in conjunction with which they were developed, these circuits have not proved entirely satisfactory for use with the larger darker screens now more commonly available. The foregoing circuits have also shown a certain lack of responsiveness to lower level peak beam current conditions. These circuits are intended for use with receivers which are used not only with television program material, but computer displays and video games as well. Computer displays and video games are more likely to generate the geometrical patterns responsible for more serious shadow mask blistering and warping.

SUMMARY OF THE INVENTION

It is an aspect of the invention to provide an anti-blister circuit which is capable of preventing localized shadow mask heating during the display of white areas, for example blocks, which are smaller than 10% of the horizontal width. In accordance with this aspect of the invention, an anti-blister circuit is more sensitive, by responding to peak beam current conditions for each horizontal scanning line and by monitoring a signal related to luminance of the video signal.

An anti-blister circuit in accordance with this aspect of the invention comprises first means for detecting amplitude excursions of a signal with luminance information beyond a white level threshold during each horizontal scan. This enables the circuit to be responsive to excursions occurring during each horizontal scanning line. Second means, responsive to the first means, is provided for developing a first control signal related to a minimum duration of each amplitude excursion of the signal beyond the threshold. This enables the circuit to avoid controlling beam current, for example by reducing contrast, responsive to signal peaks which are too short to cause blistering or warping. Finally, third means responsive to the first control signal is provided for developing a second control signal to reduce beam current, for example by reducing contrast, during each minimum duration amplitude excursion; and, to permit the beam current to increase after termination of the amplitude excursion, until the next minimum duration excursion.

It is another aspect of the invention to provide an anti-blister circuit which reduces viewer perception of the limiting action by acting quickly at the onset of the limiting action by the circuit and by acting slowly at termination of the limiting action.

In accordance with this aspect of the invention, the second control signal varies at a first rate to reduce beam current and varies at a second rate to permit beam current to increase. The first rate is faster than the second rate, for example, by a factor of approximately $10^5$.

It is still another aspect of the invention to provide an anti-blister-circuit which is simple in construction and inexpensive to implement, and which is especially appropriate for television program material.

In accordance with this aspect of the invention, an anti-blister circuit comprises a relatively small number of components, for example, first and second transistors, first and second integrating networks and a biasing network for the transistors. The first transistor has a base electrode coupled for receiving a luminance signal derived from a video signal, an emitter electrode coupled to a first tap of the biasing network and a collector electrode for generating a first charging current as a first control signal responsive to each excursion of the luminance signal beyond a white level threshold during each horizontal scan. The first integrating network is coupled to the first transistor and responsive to the first control signal for generating a first voltage level as a second control signal. The second transistor is responsive to the second control signal and has a base electrode coupled to the first integrating network, an emitter electrode coupled to a second tap of the biasing network and a collector electrode for generating a second charging current as a third control signal. The second integrating network is coupled to the second transistor and responsive to the third control signal for generating a beam current control signal to reduce beam current during each minimum duration excursion.

DESCRIPTION OF THE PREFERRED EMBODIMENTS

Figure 1:
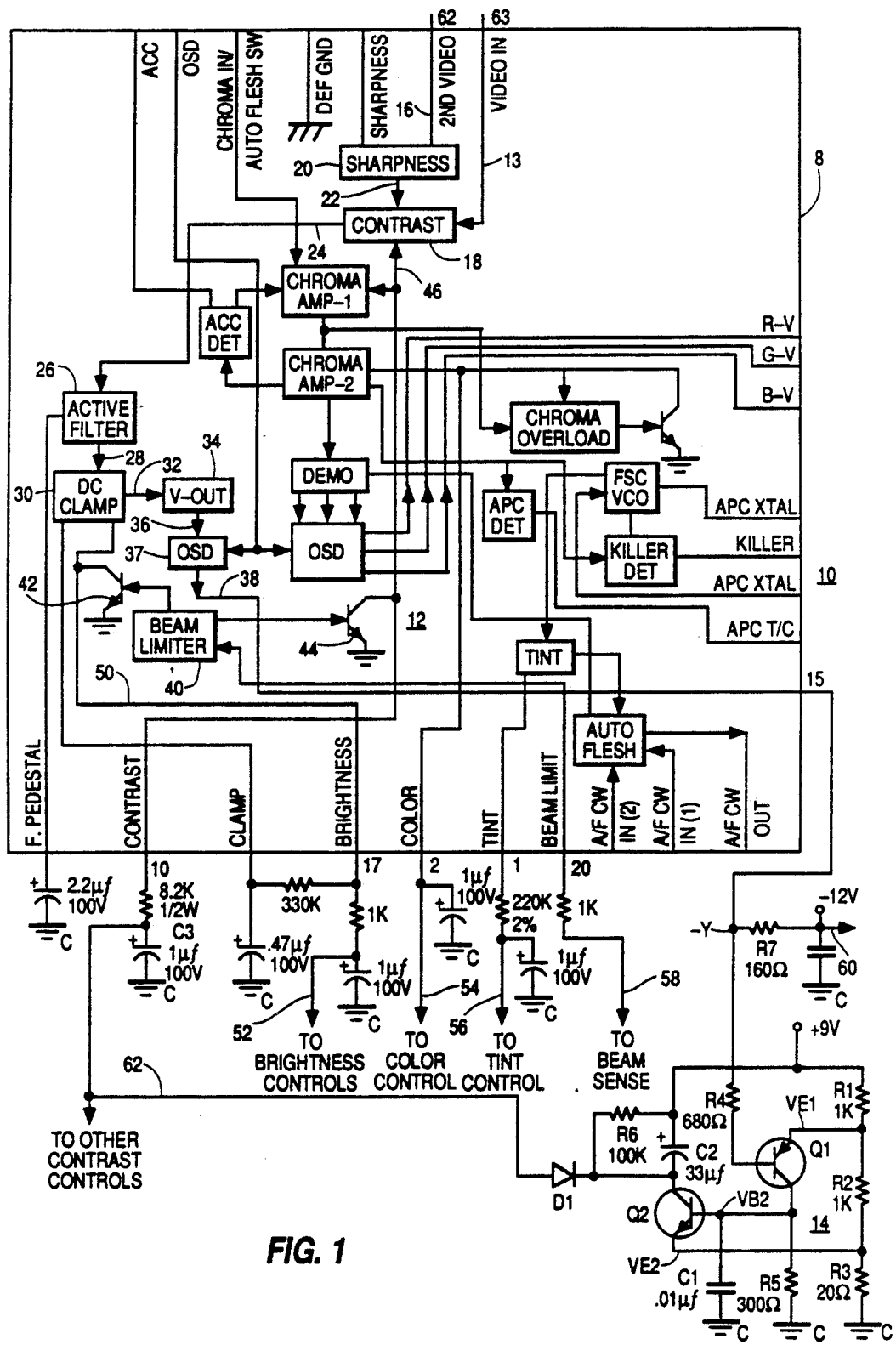
FIG. 1 is a schematic diagram of a video control circuit incorporating an anti-blister circuit according to this invention; and, FIGS. 2(a), 2(b) and 2(c) are graphs illustrating operation of the anti-blister circuit shown in FIG. 1.

A video control circuit 10 is shown schematically, in part, in FIG. 1. The video control circuit 10 comprises a video control section 12 of an integrated circuit 8 and an anti-blister circuit 14. Such an integrated circuit, sometimes referred to as a one-chip, has several circuits integrated therein, for example, the video control section, a deflection control section and an IF section. The one-chip 8 illustrated in FIG. 1 is available as RCA part number 1A51100-01A from Thomson Consumer Electronics, Indianapolis, Ind. Those portions of the one-chip not pertinent to operation of this invention has been omitted for purposes of clarity. A number of input and output pins are shown in FIG. 1 in order to fully illustrate the video control portion 12, but are also not pertinent to operation of the invention, and are not discussed in detail. The anti-blister circuit 14 has an input coupled to an output of the one-chip 8 on pin 15 thereof and an output on line 62 coupled to an input of the one-chip 8 on pin 10 thereof.

The receiver in which this particular one-chip is used may be capable of displaying two pictures simultaneously, often referred to as pix-in-pix, and may be capable of generating on-screen displays for enabling a viewer to control the receiver. A first video signal received at pin 63 is coupled directly to contrast control 18 on line 13. A second video signal received at pin 62 is indirectly coupled to the contrast control 18, by line 16, sharpness control 20 and line 22. The output of contrast control 18 on line 24 is an input to an active filter 26. The output of active filter 26 on line 28 is one input to DC CLAMP 30. The output of DC CLAMP 30 on line 32 is an input to a Y-OUT circuit 34. The Y-OUT circuit 34 provides a luminance signal Y as an output, which has been derived from the selected one of the first and second video signals. The output of the Y-OUT circuit on line 36 is an input to a first on-screen display OSD control 37. The first on-screen display control 37 provides a luminance signal $-Y$ on line 38, which is the output on pin 15 of the one-chip 8. Pin 15 is tied to a $-12$ volt supply through resistor R7, which provides a negative magnitude voltage level control signal as an input to the anti-blister circuit 14 at one terminal of resistor R4. The $-12$ volt voltage supply is provided to other loads on line 60.

One-chip 8 is provided with a number of control circuits responsive to various automatic control circuits and viewer adjustment controls. A BRIGHTNESS control input on pin 17 is coupled by line 52 to other brightness controls, for example, viewer adjustable control elements and automatic beam limiting circuits. A COLOR input on pin 2 is coupled, for example, to a viewer adjustable color control by line 54. A TINT input on pin 1 is coupled, for example, to a viewer adjustable tint control on line 56. A beam limiter 40 has an input on pin 20 which is coupled to a source of beam current sense voltage or current by line 58. Beam limiter 40 controls a transistor switch 42 and a transistor switch 44. Transistor switch 42 can be effective for reducing brightness level and transistor switch 44 can be effective for reducing contrast level. Such beam limiter circuits are generally responsive to average beam current levels, and work in conjunction with other beam limiter circuits, such as anti-blister circuit 14. In this regard, the output of anti-blister circuit 14 on line 62 is an input to a CONTRAST pin 10, as are the outputs of viewer adjustable control elements and automatic contrast control circuits.

The anti-blister circuit 14 comprises a first transistor Q1, a second transistor Q2, a first integrating network formed by capacitor C1 and resistor R5, a second integrating network formed by capacitor C2 and resistor R6 and a biasing network comprising resistors R1, R2 and R3. Resistor R4 is a current limiting resistor coupled between pin 15 of the one-chip 8 and the base of transistor Q1.

The biasing network formed by resistors R1, R2 and R3 determines the turn-on voltage thresholds for transistors Q1 and Q2. When transistors Q1 and Q2 are both turned off, and for the component values shown, the voltage VE1 at the emitter of transistor Q1 is approximately 4.3 volts. The voltage VE2 at the emitter of transistor Q2 is approximately 0.1 volts. The voltage VB2 at the base of transistor Q2 is approximately 0.0 volts. The voltage Vo at the collector of transistor Q2 is approximately 9.0 volts.

The first integrating network formed by resistor R5 and capacitor C1 determines the time constant, and at what size of white area the anti-blister circuit will begin to reduce video drive, by reducing contrast. The time constant of the first integrating network, for the component values shown is approximately 3 microseconds. This corresponds to approximately 5% of the horizontal scanning line, or 0.05 H where H is the horizontal scanning period for each horizontal line.

The second integrating network formed by capacitor C2 and resistor R6 controls the rate at which voltage $V_O$ can pull down the contrast level and controls the release time of the contrast control circuit by the anti-blister circuit. Resistor R6 is sufficiently large that it can be ignored for purposes of determining the time constant for reducing output voltage $V_O$. The time constant is approximately 33 microseconds. The time constant for releasing contrast control must take resistor R6 into account, and accordingly, the release time constant is approximately 3.3 seconds, larger by a ratio of approximately $10^5$. The ratio is preferably at least on the order of approximately $10^3$.

Operation of the anti-blister circuit 14 will be explained in conjunction with FIGS. 2(a), 2(b) and 2(c). These figures are not to scale. FIG. 2(a) illustrates four successive horizontal scan lines H1, H2, H3 and H4. Scan line H1 is intended to represent a typical waveform for a narrow white bar, whereas waveforms H2, H3 and H4 are intended to illustrate typical waveforms for a wide white bar.

When the $-Y$ luminance signal falls to approximately 3.7 volts, which is approximately one diode drop below the threshold biasing voltage of 4.5 volts, transistor Q1 will turn on and generate a charging current through its collector as a first control signal to the first integrating network of resistor R5 and capacitor C1. The voltage VB2 will begin to rise at time t1 as shown in FIG. 2(b). Transistor Q2 will not turn on until voltage VB2 is approximately 0.8 volts, that is, approximately one diode drop above the biasing voltage of 0.1 volts at its emitter. As illustrated in FIG. 2(a), the white bar is sufficiently narrow that by the time the luminance signal no longer exceeds the threshold, at time t2, voltage VB2 has not yet reached the threshold for turning on transistor Q2. Accordingly, the charge on capacitor C1 discharges and voltage VB2 falls back to 0 volts at time t3.

Horizontal scan H2 has a much wider portion exceeding the threshold than did scan H1. Transistor Q1 begins conducting at time t4. Voltage VB2 exceeds the 0.8 volt threshold at time t5, and transistor Q2 conducts until time t6, when the luminance level falls below the threshold. During the interval between time t5 and time t6 transistor Q2 is generating a second charging current, primarily through capacitor C2, which causes a drop in the voltage level of output signal Vo. This drop occurs relatively rapidly. After time t6, the capacitors of both the first and second integrating networks discharge. Capacitor C1 has discharged by time t7. However, in view of the very long time constant of capacitor C2 and resistor R6, output voltage Vo will have risen very little prior to the next operative cycle of the anti-blister circuit. The very gradual rate at which voltage Vo rises between conduction intervals of transistor Q2 is difficult to illustrate in scale. Each successive horizontal line in which the luminance signal undergoes an excursion beyond the threshold, for the minimum time duration necessary for voltage VB2 to exceed its threshold, the output voltage Vo will fall further and further. The effect on the contrast level is not immediate, as each successive drop in output voltage is not applied directly to the contrast control 18, but instead tends to discharge electrolytic capacitor C3 which is coupled to input pin 10. After a certain number of successive horizontal lines in which the output voltage is pulled successively lower, for example fifteen to twenty lines, the maximum white level will approach the 3.7 volt threshold level as shown by horizontal scan line H20. It can be seen that VB2 rises more slowly during H20 because the white level excursion is closer to the threshold. In other words, capacitor C1 charges more slowly. At the same time, the output voltage Vo will approach an average or equilibrium value and be substantially straight and level, as shown in the right-hand part of FIG. 2(c) below H20. The equilibrium level for the output voltage Vo will correspond to the level reached when voltage VB2 is just large enough to turn on transistor Q2.

The onset of contrast control responsive to output voltage Vo is effected rather rapidly, notwithstanding the effect of capacitor C3, as the reduction in contrast and brightness (as a consequence of reducing video gain) will not be very noticeable because the portion of the picture is quite bright to begin with. On the other hand, the very long time constant for releasing control of the contrast level enables an equilibrium condition of maximum white level and voltage signal Vo to be reached quite gradually, as the picture will not be so bright and a rapid change of contrast and/or brightness might be quite perceptible. The range of the output voltage Vo is generally between 2 volts and 9 volts, for the illustrated embodiment. Diode D1 prevents the output voltage Vo at the collector of transistor Q2 from being pulled down by other contrast control voltages which are also coupled to the contrast control line 50, for example, the manual control.

The anti-blister circuit according to the invention will allow normal operation of the receiver when small white areas are displayed, but will reduce video drive when larger white areas are displayed. Other circuits, for example the beam limiter 40, will still operate on white areas which are larger yet, or when overall beam current exceeds a certain threshold. The circuit will respond to horizontal information only, insofar as minimum time duration excursions of the luminance signal beyond the threshold will affect the output voltage $V_O$, without the need for the condition to necessarily persist for several successive fields. The anti-blister circuit shown, for example, will not attenuate a one inch high vertical bar but will reduce video drive for a three inch high vertical bar.

What is claimed is:

1. An anti-blister circuit for protecting a shadow mask on a cathode ray tube, the circuit comprising:
    first means for detecting amplitude excursions of a signal related to luminance beyond a white level threshold during each horizontal scan;
    second means, responsive to the first means, for developing a first control signal related to a minimum duration of each said amplitude excursion of the signal beyond the threshold; and,
    third means responsive to the first control signal for developing a second control signal to reduce beam current during each said minimum duration amplitude excursion and to permit the beam current to increase after termination of each said minimum duration amplitude excursion.

2. The circuit of claim 1, wherein the second control signal varies at a first rate to reduce the beam current and varies at a second rate to permit the beam current to increase.

3. The circuit of claim 2, wherein the first rate is faster than the second rate by a factor on the order of at least approximately $10^3$.

4. The circuit of claim 2, wherein the first rate is faster than the second rate by a factor on the order of approximately $10^5$.

5. The circuit of claim 1, wherein the signal is a luminance signal derived from a video signal.

6. The circuit of claim 1, wherein the first means comprises a level detector for comparing the signal in amplitude with a bias level and generating a charging current when the amplitude exceeds the bias level.

7. The circuit of claim 1, wherein the second means comprises means for timing said each amplitude excursion by integrating a charging current generated by the first means and generating a voltage level as the first control signal.

8. The circuit of claim 1, wherein the third means comprises:
   a level detector responsive to the first control signal for generating a charging current; and,
   an integrating network responsive to the charging current for generating the second control signal.

9. The circuit of claim 1, comprising:
   a first level detector for comparing the signal in amplitude with a bias level and generating a charging current when the amplitude exceeds the bias level;
   means for timing said each amplitude excursion by integrating the charging current generated by the first level detector and generating a voltage level as the first control signal;
   a second level detector responsive to the first control signal for generating the second control signal as a second charging current; and,
   an integrating network responsive to the second charging current having a faster charging rate than a discharge rate.

10. The circuit of claim 9, wherein the signal is a luminance signal derived from a video signal.

11. An anti-blister circuit for protecting a shadow mask on a cathode ray tube, the circuit comprising:
   first means, coupled for receiving a luminance signal derived from a video signal and coupled to a first bias voltage source, for generating a first charging current as a first control signal responsive to each excursion of the luminance signal beyond a white level threshold during each horizontal scan;
   a first integrating network coupled to the first means and responsive to the first control signal for generating a first voltage level as a second control signal;
   second means, coupled to the first integrating network and to a second bias voltage source, and responsive to the second control signal for generating a second charging current as a third control signal; and,
   a second integrating network coupled to the second means and responsive to the third control signal for generating a beam current control signal to reduce beam current during each minimum duration excursion.

12. The circuit of claim 11, wherein the first means comprises a transistor having a base electrode coupled for receiving the luminance signal, an emitter electrode coupled to the first bias voltage source and a collector electrode for generating the first charging current as the first control signal.

13. The circuit of claim 11, wherein the second means comprises a transistor having a base electrode coupled to the first integrating network, an emitter electrode coupled to the second bias voltage source and a collector electrode for generating the second charging current as the third control signal.

14. The circuit of claim 11, wherein the second integrating network has a faster charging rate, to vary the beam current control signal to reduce beam current, than a discharge rate, to vary the beam current control signal to permit beam current to increase, by a factor on the order of at least approximately $10^3$.

15. The circuit of claim 11, wherein the second integrating network has a faster charging rate, to vary the beam current control signal to reduce beam current, than a discharge rate, to vary the beam current control signal to permit beam current to increase, by a factor on the order of approximately $10^5$.

16. The circuit of claim 11, wherein the luminance signal is substantially unfiltered and coupled to the first means as a negative polarity signal.

17. An anti-blister circuit for protecting a shadow mask on a cathode ray tube, the circuit comprising:
   a first transistor having a base electrode coupled for receiving a luminance signal derived from a video signal, an emitter electrode coupled to a first bias voltage source and a collector electrode for generating a first charging current as a first control signal responsive to each excursion of the luminance signal beyond a white level threshold during each horizontal scan;
   a first integrating network coupled to the first transistor and responsive to the first control signal for generating a first voltage level as a second control signal;
   a second transistor responsive to the second control signal and having a base electrode coupled to the first integrating network, an emitter electrode coupled to a second bias voltage source and a collector electrode for generating a second charging current as a third control signal; and,
   a second integrating network coupled to the second transistor and responsive to the third control signal for generating a beam current control signal to reduce beam current during each minimum duration excursion.

18. The circuit of claim 17, wherein the second integrating network has a faster charging rate, to vary the beam current control signal to reduce beam current, than a discharge rate, to vary the beam current control signal to permit beam current to increase, by a factor on the order of at least approximately $10^3$.

19. The circuit of claim 17, wherein the second integrating network has a faster charging rate, to vary the beam current control signal to reduce beam current, than a discharge rate, to vary the beam current control signal to permit beam current to increase, by a a factor on the order of approximately $10^5$.

20. The circuit of claim 17, wherein the luminance signal is substantially unfiltered and coupled to the first transistor as a negative polarity signal.

21. A control circuit, comprising:
   first means for detecting amplitude excursions of a signal related to luminance beyond a white level threshold during each horizontal scan;
   second means, responsive to the first means, for developing a first control signal related to a minimum duration of each said amplitude excursion of the signal beyond the threshold; and,
   third means responsive to the first control signal for developing a second control signal to reduce the amplitude of the signal during each said minimum duration amplitude excursion and to permit the amplitude of the signal to increase after termination of each said minimum duration amplitude excursion.

22. The circuit of claim 21, wherein the second control signal varies at a first rate to reduce the signal and varies at a second rate to permit the signal to increase.

23. The circuit of claim 22, wherein the first rate is faster than the second rate by a factor on the order of at least approximately $10^3$.

24. The circuit of claim 22, wherein the first rate is faster than the second rate by a factor on the order of approximately $10^5$.

25. The circuit of claim 21, wherein the signal is a luminance signal derived from a video signal.

26. The circuit of claim 21, wherein the first means comprises a level detector for comparing the signal amplitude with a bias level and generating a charging current when the amplitude exceeds the bias level.

27. The circuit of claim 21, wherein the second means comprises means for timing said each amplitude excursion by integrating a charging current generated by the first means and generating a voltage level as the first control signal.

28. The circuit of claim 21, wherein the third means comprises:
a level detector responsive to the first control signal for generating a charging current; and,
an integrating network responsive to the charging current for generating the second control signal.

29. The circuit of claim 21, comprising:
a first level detector for comparing the signal amplitude with a bias level and generating a charging current when the amplitude exceeds the bias level;
means for timing said each amplitude excursion by integrating the charging current generated by the first level detector and generating a voltage level as the first control signal;
a second level detector responsive to the first control signal for generating the second control signal as a second charging current; and,
an integrating network responsive to the second charging current having a faster charging rate than a discharge rate.

30. The circuit of claim 29, wherein the signal is a luminance signal derived from a video signal.

31. A control circuit, comprising:
first means, coupled for receiving a luminance signal derived from a video signal and coupled to a first bias voltage source, for generating a first charging current as a first control signal responsive to each excursion of the luminance signal beyond a white level threshold during each horizontal scan;
a first integrating network coupled to the first means and responsive to the first control signal for generating a first voltage level as a second control signal;
second means, coupled to the first integrating network and to a second bias voltage source, and responsive to the second control signal for generating a second charging current as a third control signal; and,
a second integrating network coupled to the second means and responsive to the third control signal to reduce the amplitude of the luminance signal during each minimum duration excursion.

32. The circuit of claim 31, wherein the first means comprises a transistor having a base electrode coupled for receiving the luminance signal, an emitter electrode coupled to the first bias voltage source and a collector electrode for generating the first charging current as the first control signal.

33. The circuit of claim 31, wherein the second means comprises a transistor having a base electrode coupled to the first integrating network, an emitter electrode coupled to the second bias voltage source and a collector electrode for generating the second charging current as the third control signal.

34. The circuit of claim 31, wherein the second integrating network has a faster charging rate than a discharge rate by a factor on the order of at least approximately $10^3$.

35. The circuit of claim 31, wherein the second integrating network has a faster charging rate than a discharge rate by a factor on the order of approximately $10^5$.

36. The circuit of claim 31, wherein the luminance signal is substantially unfiltered and coupled to the first means as a negative polarity signal.

37. A control circuit, comprising:
a first transistor having a base electrode coupled for receiving a luminance signal derived from a video signal, an emitter electrode coupled to a first bias voltage source and a collector electrode for generating a first charging current as a first control signal responsive to each excursion of the luminance signal beyond a white level threshold during each horizontal scan;
a first integrating network coupled to the first transistor and responsive to the first control signal for generating a first voltage level as a second control signal;
a second transistor responsive to the second control signal and having a base electrode coupled to the first integrating network, an emitter electrode coupled to a second bias voltage source and a collector electrode for generating a second charging current as a third control signal; and,
a second integrating network coupled to the second transistor and responsive to the third control signal for generating a beam current control signal to reduce beam current during each minimum duration excursion.

38. The circuit of claim 37, wherein the second integrating network has a faster charging rate, to vary the beam current control signal to reduce beam current, than a discharge rate, to vary the beam current control signal to permit beam current to increase, by a factor on the order of at least approximately $10^3$.

39. The circuit of claim 37, wherein the second integrating network has a faster charging rate, to vary the beam current control signal to reduce beam current, than a discharge rate, to vary the beam current control signal to permit beam current to increase, by a a factor on the order of approximately $10^5$.

40. The circuit of claim 37, wherein the luminance signal is substantially unfiltered and coupled to the first transistor as a negative polarity signal.

* * * * *